United States Patent Office 3,409,397
Patented Nov. 5, 1968

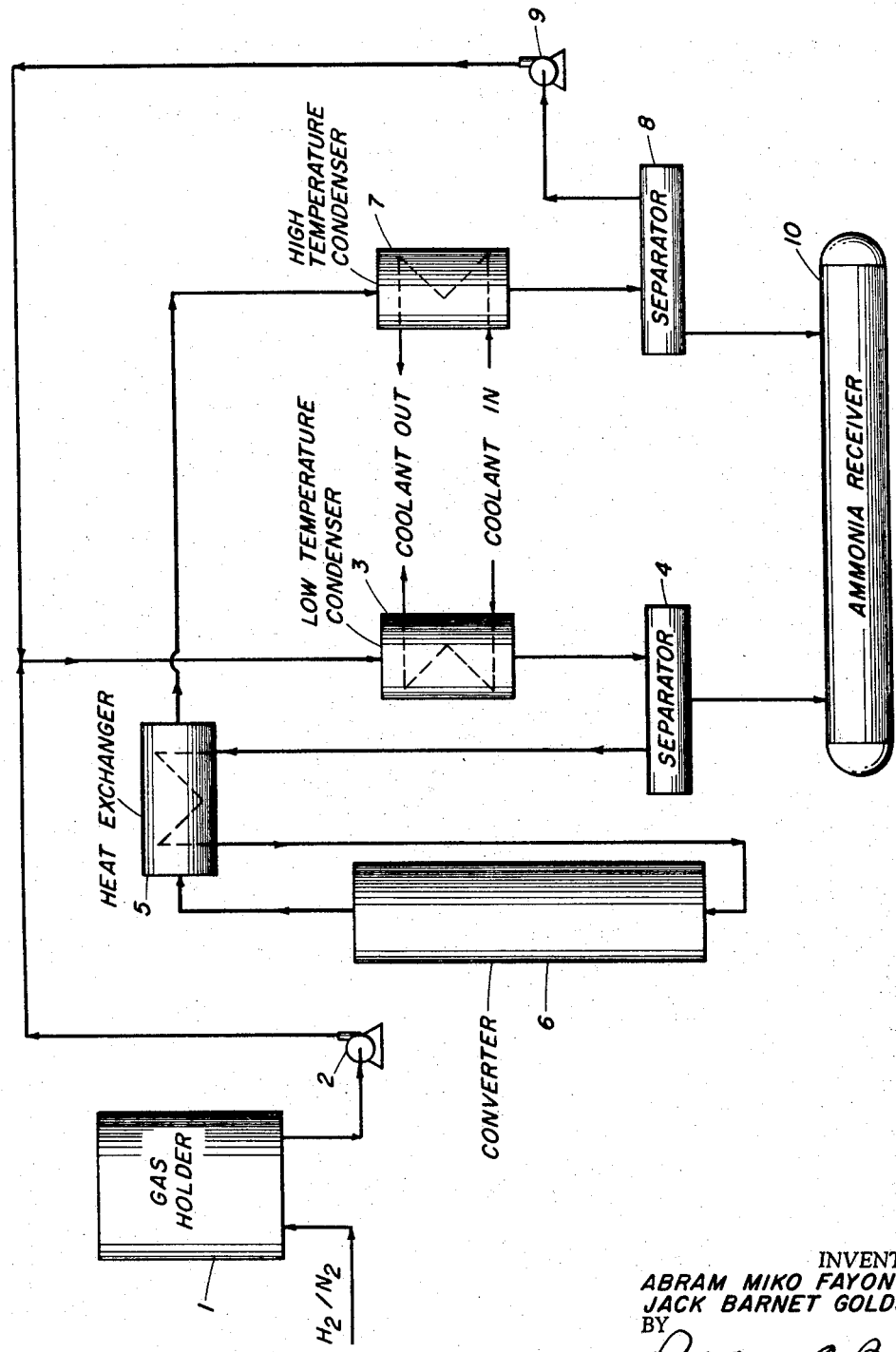

3,409,397
AMMONIA SYNTHESIS
Abram Miko Fayon, New York, and Jack Barnet Goldstein, Queens, N.Y., assignors to American Cyanamid Company, Stamford, Conn., a corporation of Maine
Filed May 19, 1965, Ser. No. 456,947
3 Claims. (Cl. 23—199)

ABSTRACT OF THE DISCLOSURE

Ammonia is produced by reacting hydrogen and nitrogen in the presence of lithium amide at pressures of at least 2400 p.s.i.g. and temperatures of 350°–500° C. Under these conditions lithium imide, produced by the ammonia-forming reaction, is converted to lithium amide by reaction with additional hydrogen and nitrogen.

---

This invention relates to the production of ammonia. More particularly, this invention relates to a continuous process for the production of ammonia from hydrogen and nitrogen.

For commercial acceptance it is desirable that ammonia production be continuous and based on inexpensive starting materials. For these reasons the accepted methods of ammonia production generally involve the direct catalytic conversion of hydrogen and nitrogen to ammonia with reuse of unreacted hydrogen or nitrogen and regeneration or replenishment of the catalyst in a continuous operation.

U.S. Patent 1,737,953 to Urfer discloses a process for the production of ammonia by the reaction of hydrogen, nitrogen and certain nitrogen-containing lithium compounds in the presence of a metal such as iron and an alkali-forming halide. Under these conditions it is taught that conversion to ammonia is achieved at temperatures lower than are ordinarily permissible. The patent is silent in regard to whether the nitrogen-containing lithium compound is consumed in the reaction, i.e., whether it dissociates to form ammonia. The patent is likewise silent as to whether the process could be operated in a continuous fashion to produce ammonia.

A principal object of the present invention is to provide a continuous process for the production of ammonia directly from hydrogen and nitrogen.

A further object of the invention is to provide a continuous process for the production of the ammonia from hydrogen and nitrogen in the presence of a catalytic material which may be regenerated so as to maintain a closed cycle without the necessity of substantially replenishing the catalyst.

These and other objects, advantages and features of the present invention will become more apparent from the detailed description which follows.

In accordance with the present invention there is provided a continuous process for the production of ammonia which comprises reacting hydrogen and ntirogen in the presence of lithium amide wherein the reaction is conducted at a pressure effective for regeneration of the lithium amide.

The following equations represent what are considered to be the principal chemical reactions involved in the present process:

(1)    $4LiNH_2 + 3H_2 + N_2 \rightarrow 2Li_2NH + 4NH_3$ (2)    $2Li_2NH + 3H_2 + N_2 \rightarrow 4LiNH_2$ The sum of Equations 1 and 2 give the overall reaction as follows:

(3)    $6H_2 + 2N_2 \rightarrow 4NH_3$

It will be seen that the lithium imide produced as a by-product in Equation 1 reacts further with the hydrogen-nitrogen mixture in Equation 2 to regenerate the lithium amide. Further, it will be seen that the lithium amide is not consumed in the overall reaction and therefore provides a catalytic effect. The consequence is a closed cycle and a continuous process.

One of the features which essentially distinguishes the present invention from U.S. Patent 1,737,953, to Urfer is that in order to achieve a closed cycle, i.e., continuous production of ammonia, the present reaction is maintained at or above a critical operating pressure effective for regeneration of the lithium amide in accordance with Equation 2. This critical reaction pressure has been found to be at least about 2400 pounds per square inch gauge (p.s.i.g.). Generally, the higher the pressure above 2400 p.s.i.g. the greater will be the yield of ammonia at a constant temperature However, it is impractical because of prohibitively expensive equipment to maintain the operating pressure above about 4500 p.s.i.g. The preferred operating pressure range is from about 2500 to 3500 p.s.i.g. inclusive.

The reaction temperature must be high enough to promote conversion to ammonia The upper limit is generally about 500° C. since further increases will retard the reaction by favoring the decomposition of ammonia. Thus, effective temperatures are in the range of from about 350° C. to 500° C. inclusive and preferably from about 400° C. to 450° C. inclusive.

The relative amounts of reactants and lithium amide catalyst are not critical although sufficient amounts of each should be present to maintain reaction rate and product yield at economical levels. A mixing of hydrogen and nitrogen in any proportions will obviously react under the conditions of the invention to provide ammonia. Nevertheless, for efficiency of reaction it is beneficial to maintain the mole ratio of hydrogen to nitrogen at about 3 to 1, respectively. Preferably the hydrogen will be present in an excess over the 3 moles of hydrogen to one of nitrogen, e.g., 5 to 25% of a mole excess.

The amount of lithium amide catalyst as well as rate of reaction and yield of ammonia will depend on the choice of space velocity of the reaction in addition to operating pressure and temperature. Space velocity is defined as cubic feet of reaction mixture gas corrected to standard temperature and pressure (STP: 0° C. and 1 atmosphere), passed per hour over one cubic foot of catalyst (solid or liquid). The space velocity is a non-critical operating condition of the invention and may be widely varied as desired, e.g., from about 10,000 to 50,000, preferably from about 20,000 to 40,000, reciprocal hours (hr.$^{-1}$) inclusive. The residence time of the reaction mixture is the reciprocal of the space velocity and may be readily calculated from space velocity settings, or vice versa.

The accompanying flow sheet is illustrative of a particular embodiment of the overall process of the invention. In reference thereto, a mixture of hydrogen and nitrogen, preferably in a mole ratio of 3 to 1, respectively, is passed into a gas holder 1 which functions as a reservoir and pressure surge tank for the mixture of the reaction gases. From the gas holder the gas mixture is compressed to the desired operating pressure in compressor 2, mixed with return cycle hot unreacted or product gases as hereinafter described, and is then passed into low temperature condenser 3 operated by a suitable refrigerant to liquefy any ammonia present. Separator unit 4 thereafter permits the liquid ammonia to fall into ammonia receiver 10 and unreacted gases and a minor amount of ammonia to pass into heat exchanger 5 wherein the temperature of the gas mixture is raised by heat exchange with effluent hot product vapor from converter 6. From heat exchanger 5 the reaction mixture moves into the aforementioned converter unit 6. Converter 6 is heated by any suitable means such as interior or exterior electric or hot fluid jacket, coils or other heat exchange means or it may be directly heated with gas jets and the like. Converter 6 contains lithium amide in any arrangement effective for maximum contact with the reaction mixture of hydrogen and nitrogen.

The hot product emitted from converter 6 passes through heat exchanger 5 wherein it is somewhat cooled by heat exchange with incoming reaction mixture. Thence it enters high temperature condenser 7 in which a suitable coolant such as water, maintained in a jacket or coils interior or exterior to the chamber, causes condensation of the ammonia vapor. The product mixture then passes into separator tank 8 from which the liquid ammonia flows into ammonia receiver 10. Uncondensed ammonia and unreacted gas emitted from the separator tank 8 is maintained at the operating pressure by transmission through compressor 9 from where it mixes with incoming reaction mixture gases from gas holder 1 to repeat the cycle. The effluent mixture from condenser 9 will, of course, be at a higher reaction temperature than the incoming reaction mixture from gas holder 1 so as to maintain a constantly high reaction temperature throughout the cycle.

Although not shown in the flow sheet it will be apparent that the invention includes a process wherein the catalytic conversion to ammonia corresponding to the reaction of Equation 1 above is conducted in one converter unit, the ammonia drawn off substantially as herein described, and the lithium amide then regenerated in a second converter in accordance with the reaction of Equation 2 above. While continuity of process may be achieved in this manner no particular advantage is gained thereby, particularly in view of the expense of providing a second converter unit.

As is known to those skilled in the art it is preferred to avoid the presence of moisture in any step or unit of the reaction scheme due to the degradative effect of water on the catalyst and equipment. Conventional means will be employed to maintain this substantially dry condition as, for example, by employing dry reaction gases, moisture proof lines and units, and the like means.

In addition to the continuity of the process, the invention has the advantage that conventional catalysts employed in the art are unnecessary. For example, the metal catalyst and alkali-forming halide in U.S. Patent 1,737,953 to Urfer need not be employed.

The following examples illustrate the invention and particularly the criticality of maintaining the operating pressure at a level effective for regeneration of the lithium amide. Although the reactions are described as having been conducted in an autoclave, it will be apparent to those skilled in the art that other procedures such as outlined in the accompanying flow sheet are operable. These examples are primarily for the purpose of illustration and are not to be construed as a limitation on the invention except as defined in the appended claims. Unless otherwise noted all parts are by weight and all temperatures are in degrees centigrade.

EXAMPLES

A stainless steel rocking autoclave of 240 ml. capacity, such as described in U.S. Patent 3,155,155, was charged with lithium amide under an argon atmosphere. Then was introduced hydrogen and nitrogen to a predetermined pressure effective to provide the desired mole ratio. The autoclave was heated under rocking agitation to obtain the desired pressure and temperature and maintained under these conditions for the desired reaction time. Thereafter, the autoclave was cooled and the amount of ammonia determined by venting the autoclave and bubbling the product gases through a boric acid solution followed by back titration with 0.1 N hydrochloric acid solution to give the equivalents of ammonium borate formed. The non-absorbable hydrogen and nitrogen gases were analyzed by mass spectrometry for additional information on product distribution.

The solid residue remaining after each run reaching or exceeding 350° C. was a hard, gray white film which adhered tightly to the walls of the autoclave. The residue from lower temperature runs was a powder of the same color. Residue samples from the runs were analyzed for lithium, nitrogen and hydrogen.

Tables I and II below summarize test conditions and results for various runs. In Table I, run 3 was conducted using lithium amide and hydrogen only. Some ammonia was formed and the hydrogen consumed approaches a value evidencing the reaction:

$$LiNH_2 + H_2 \rightarrow LiH + NH_3$$

However, the formation of the hydride inhibits ammonia production and the yield is relatively small. The problem was therefore to avoid the formation of lithium hydride. This was done as reported in Tables I and II using a mixture of hydrogen and nitrogen. Thus runs 1 and 2 of Table I show significant yields of ammonia.

In the experiments of Table II conditions for a continuous process were provided by maintaining the original charge of lithium amide throughout the entire series of runs and by adding a fresh 3:1 hydrogen-nitrogen mixture at the start of each run. It will be seen from runs 11 and 12 that no net pressure drop is shown yet ammonia at these lower pressures is obtained although lower in yield. This demonstrates that ammonia is not resulting from dissociation of the lithium amide but rather the lithium amide is catalyzing the conversion of hydrogen and nitrogen to ammonia. If the lithium amide were dissociating into ammonia a pressure drop corresponding to the resulting ammonia would have been observed. Moreover, the cumulative pressure drop corresponding to 0.422 mole of hydrogen and nitrogen consumed checks well with the cumulative amount of 0.498 mole ammonia formed.

It is important to note that in runs 13 and 14 of Table II, where the pressure was increased to 2400 p.s.i.g. and 3000 p.s.i.g., respectively, the ammonia yield began to rise to the level of runs 1 to 10 and again a pressure drop was observed. This demonstrates that at pressures less than about 2400 p.s.i.g. only the ammonia-producing reaction of Equation 1 above is taking place. Hence, for regeneration of lithium amide for continuous production of ammonia in a closed cycle from a constant stream of hydrogen and nitrogen, the pressure must be maintained at 2400 p.s.i.g. or higher at reaction temperature.

TABLE I

| Run No. | Autoclave Charge | | | Initial Press. (p.s.i.g.) | Peak Pres. (p.s.i.g.) | Maximum Reaction Temp. (° C.) | Mole Percent Ammonia in Product Gas | Remarks |
|---|---|---|---|---|---|---|---|---|
| | LiNH₂ (moles) | H₂ (moles) | N₂ (moles) | | | | | |
| 1 | 0.174 | 0.913 | 0.302 | 1,600 | 3,475 | 409 | 3.8 | 0.0448 mole NH₃ analyzed, reaction time 17 hrs. |
| 2 | 0.174 | 0.894 | 0.302 | 1,575 | 3,550 | 408 | 1.7 | 0.0197 mole NH₃ analyzed, reaction time 3 hrs. |
| 3 | 0.174 | 1.200 | ---------- | 1,600 | 3,470 | 409 | 1.2 | 0.0138 mole NH₃ analyzed, reaction time 3 hrs. |

TABLE II.—Continuous Synthesis of Ammonia over Lithium Amide [1]

| Run No. | Pres. $H_2$ | Pres. $N_2$ | Moles $H_2$ | Moles $N_2$ | Oper. Temp., °C. | Aver. Oper. Pres. | Running Time, hrs. | Pres. Drop, p.s.i.g. | Moles of Gas Absorbed | Moles $NH_3$ | Moles $NH_3$ per Mole $LiNH_2$ | Percent Ammonia Conversion |
|---|---|---|---|---|---|---|---|---|---|---|---|---|
| 1 | 900 | 300 | 0.689 | 0.229 | 414 | 2,500 | 20 | 40 | 0.0304 | 0.0492 | 0.282 | 10.7 |
| 2 | 900 | 300 | 0.689 | 0.229 | 390 | 2,550 | 19 | 60 | 0.0456 | 0.0439 | 0.248 | 9.3 |
| 3 | 900 | 300 | 0.689 | 0.229 | 403 | 2,525 | 18 | 50 | 0.0380 | 0.0401 | 0.230 | 8.7 |
| 4 | 880 | 300 | 0.670 | 0.229 | 390 | 2,500 | 53 | 100 | 0.0760 | 0.0554 | 0.318 | 12.4 |
| 5 | 900 | 300 | 0.689 | 0.229 | 405 | 2,550 | 17 | 35 | 0.0266 | 0.0322 | 0.185 | 7.0 |
| 6 [2] | 875 | 300 | 0.665 | 0.229 | 415 | 2,525 | 18 | 40 | 0.0304 | 0.0341 | 0.196 | 7.7 |
| 7 | 870 | 290 | 0.662 | 0.221 | 392 | 2,550 | 13 | 15 | 0.0114 | 0.0277 | 0.159 | 6.3 |
| 8 | 870 | 300 | 0.662 | 0.229 | 395 | 2,425 | 17 | 30 | 0.0228 | 0.0200 | 0.114 | 4.5 |
| 9 | 885 | 295 | 0.683 | 0.225 | 405 | 2,450 | 65 | 70 | 0.0532 | 0.0501 | 0.288 | 11.0 |
| 10 | 880 | 280 | 0.670 | 0.213 | 420 | 2,550 | 17 | 40 | 0.0304 | 0.0416 | 0.239 | 9.3 |
| 11 | 720 | 240 | 0.548 | 0.182 | 405 | 2,100 | 12 | 0 | 0.0000 | 0.0187 | 0.108 | 5.1 |
| 12 | 750 | 250 | 0.570 | 0.190 | 405 | 2,200 | 21 | 0 | 0.0000 | 0.0274 | 0.157 | 7.2 |
| 13 | 900 | 300 | 0.689 | 0.229 | 355 | 2,400 | 19 | 25 | 0.0190 | 0.0095 | 0.055 | 2.1 |
| 14 | 1,050 | 350 | 0.800 | 0.266 | 403 | 3,000 | 19 | 50 | 0.0380 | 0.0492 | 0.282 | 9.2 |
| Totals | | | | | | | | | 0.422 | 0.4982 | 2.861 | |

[1] The original charge of 0.174 mole of lithium amide was present throughout all the runs.  [2] Mass Spectrometer analysis: 77.5% $H_2$, 22.5% $N_2$, air and $H_2O$ free.

We claim:

1. A continuous process for the production of ammonia which comprises reacting nitrogen and hydrogen in the presence of lithium amide at a pressure of at least 2400 p.s.i.g. and a temperature in the range of 350° C. to 500° C. said pressure and temperature being effective for regeneration of the lithium amide.

2. A process according to claim 1 wherein the space velocity of the reaction mixture gas is within the range of 20,000 to 40,000 reciprocal hours.

3. A continuous process for the production of ammonia which comprises reacting hydrogen and nitrogen in the presence of lithium amide wherein the reaction is conducted at a pressure of from about 2500 to 3500 p.s.i.g. and a temperature of from about 400° C. to 450° C.

References Cited

UNITED STATES PATENTS 1,159,364   11/1915   De Jahn _____ 23—198 X

OSCAR R. VERTIZ, *Primary Examiner.*

H. S. MILLER, *Assistant Examiner.*